March 15, 1966

G. L. ETZEL ETAL 3,239,994

ARTICLE BANDING APPARATUS

Filed Sept. 24, 1962

INVENTORS
GERALD L. ETZEL and
L. D. RYAN

BY

ATTORNEYS

March 15, 1966

G. L. ETZEL ETAL 3,239,994

ARTICLE BANDING APPARATUS

Filed Sept. 24, 1962

INVENTORS
GERALD L. ETZEL AND
L. D. RYAN
BY
*D. T. Innis*
*W. A. Schaich*
ATTORNEYS

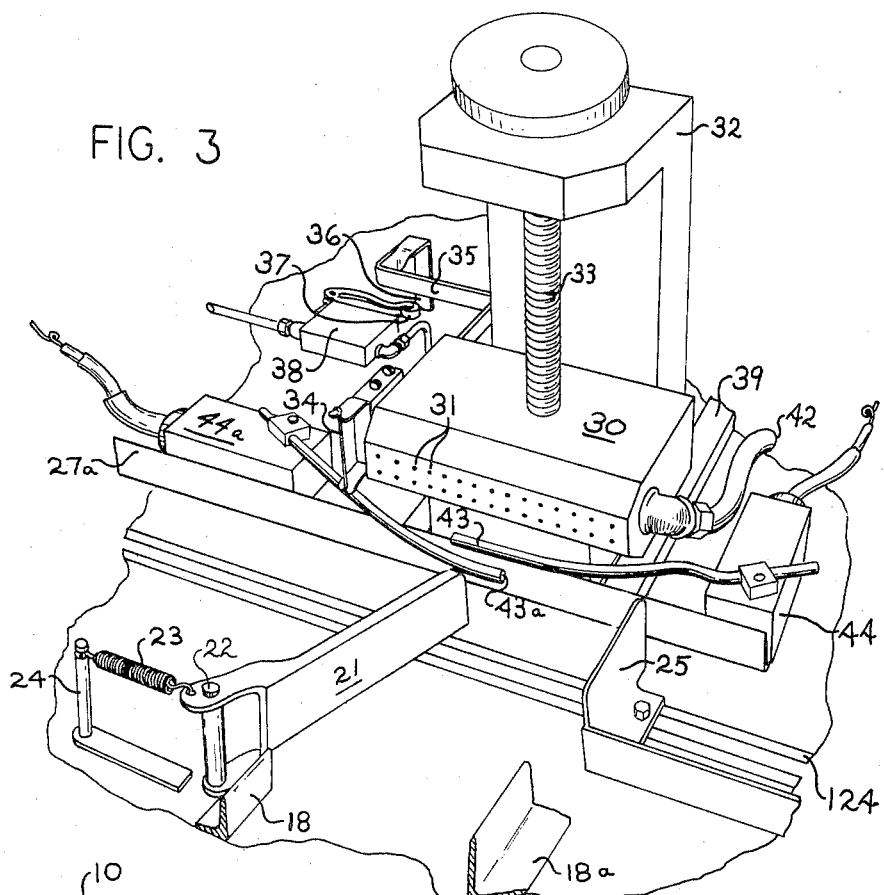
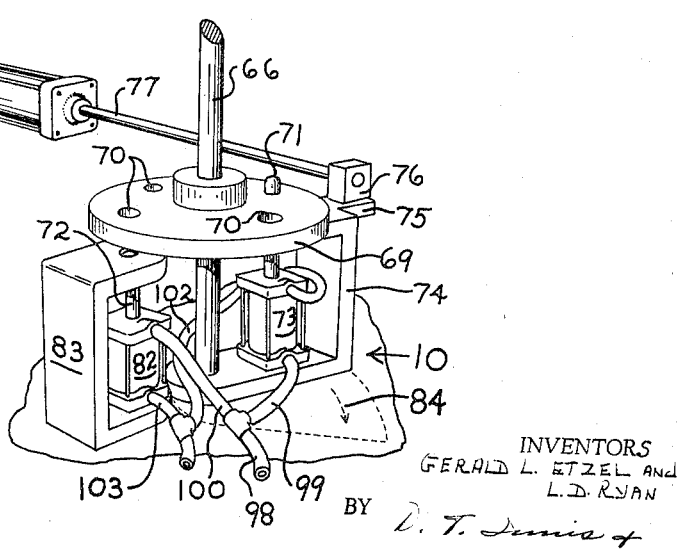

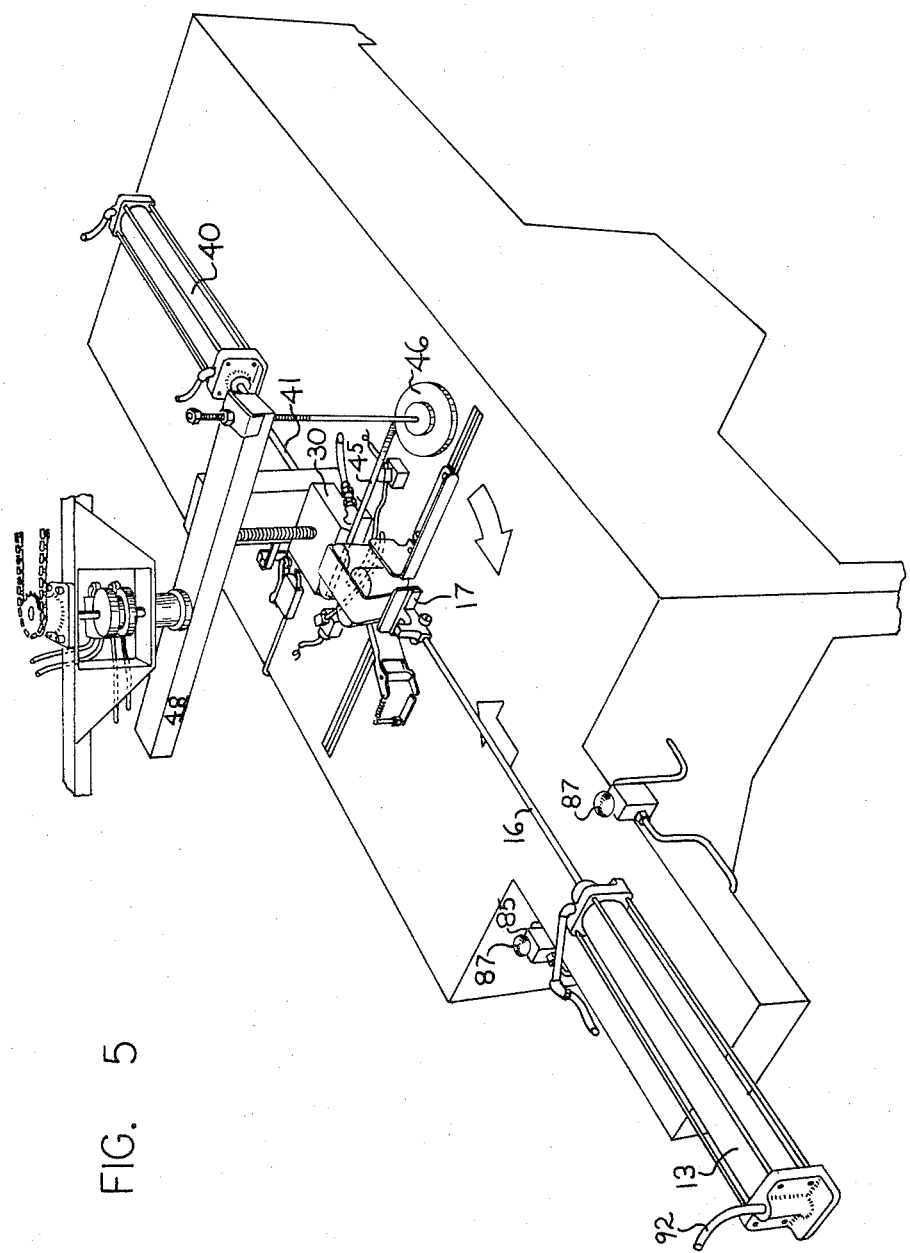

INVENTORS
Gerald L. Etzel and
L. D. Ryan
ATTORNEYS

INVENTORS
GERALD L. ETZEL And
L. D. RYAN
BY
ATTORNEYS

March 15, 1966  G. L. ETZEL ETAL  3,239,994
ARTICLE BANDING APPARATUS
Filed Sept. 24, 1962  9 Sheets-Sheet 8

INVENTORS
GERALD L. ETZEL AND
L. D. RYAN
BY
ATTORNEYS

March 15, 1966  G. L. ETZEL ETAL  3,239,994
ARTICLE BANDING APPARATUS
Filed Sept. 24, 1962  9 Sheets-Sheet 9

INVENTORS
GERALD L. ETZEL AND
L.D. RYAN
BY
ATTORNEYS

United States Patent Office 3,239,994
Patented Mar. 15, 1966

3,239,994
ARTICLE BANDING APPARATUS
Gerald L. Etzel and L D Ryan, Toledo, Ohio, assignors to Owens-Illinois Glass Company, a corporation of Ohio
Filed Sept. 24, 1962, Ser. No. 225,612
9 Claims. (Cl. 53—198)

This invention relates to apparatus for banding a plurality of articles into a composite unit. More particularly, this invention relates to apparatus for applying a band of pressure sensitive transparent tape, as, for example, Scotch tape, around a grouping of articles so as to form a composite unit or package.

It has been the practice in the past to band together a plurality of articles by fixing a band about the grouping of articles either by hand or by the method of stretching a band over the grouping of articles, such as tumblers, and permitting the band to frictionally engage the outside of the grouping of articles. These bands have been either of a flexible material, such as rubber, or of a plastic material which, after its application to the package, is shrunk about the grouping of articles, for example, as disclosed in U.S. Patent No. 3,023,554, March 6, 1962.

With the foregoing in view, it is an object of this invention to provide apparatus for applying a band about the periphery of a grouping of articles so as to retain the articles in the form of a single composite unit or package.

It is an additional object of this invention to provide an apparatus for applying a band of pressure sensitive adhesive material to a grouping of articles which is fully automatic in its operation, requiring the attendance of a single operator.

It is a further object of this invention to provide apparatus for applying a band about four articles to retain the articles as a composite group, which is fully automatic in its operation, and capable of successively banding groups of articles in a relatively short period of time.

Other and further objects will be apparent from the following description taken in conjunction with the annexed sheets of drawings, wherein:

FIG. 3 is an enlarged perspective view of the banding or taping area of the machine;

FIG. 4 is an enlarged perspective view of the drive mechanism utilized in the invention;

FIG. 5 is a schematic perspective view illustrating the loading of a group of articles into the banding zone or area;

FIG. 11 is a perspective view of a group of articles, such as tumblers, showing their orientation with respect to a separator prior to the application of the band.

Figure 1:
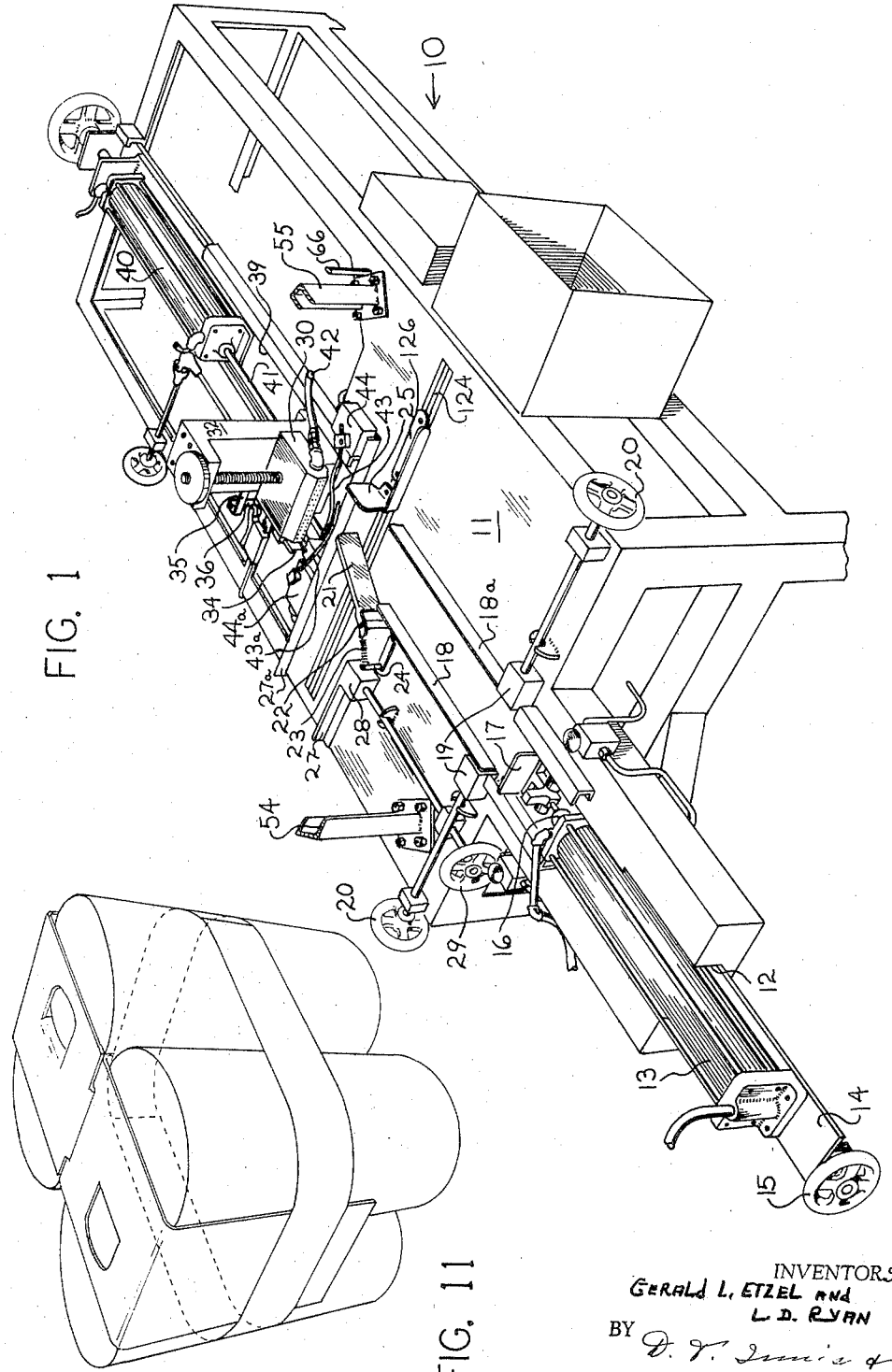
FIG. 1 is a schematic perspective view of the article supporting and handling stand of the invention.

Referring specifically to FIGS. 1-4, the general organization and arrangement of the parts which comprise the banding apparatus of the invention will be described.

The apparatus of the invention is comprised of a base 10 which takes the form of a bench-like structure, having a horizontal upper working surface 11 supported by the legs of the bench with suitable bracing elements joining the legs so as to provide a sturdy construction. Mounted toward the front of the bench within a channel 12 is a fluid motor 13. The motor 13 is anchored to a plate 14 which may be adjusted with respect to the bench 10 by means of a hand wheel 15. The fluid motor 13 is of the reciprocating type, having a piston rod 16 extending therefrom, to which is connected a pusher plate 17. Slidably mounted on the surface 11 in spaced parallel relationship with the fluid motor 13 are a pair of side rails 18 and 18a. These side rails serve to guide or confine a group of articles to a substantially straight line motion when pushed by the pusher plate 17 toward the center of the working surface 11. The side rails 18 and 18a are connected at their forward ends to sliding blocks 19 which, in cooperation with hand wheels 20, provide means for adjusting the spacing of the side rails 18 and 18a. This adjustment is advantageous from the standpoint that groups of articles of varying sizes may be banded by the apparatus of the invention. The opposite ends of the side rails 18 and 18a extend over the surface 11, but terminate at a point remote from the position of a group of articles, or, as specifically shown herein, a group of four tumblers associated with a paper board separator (see FIG. 11) when pushed into position to be banded. Adjacent the inner end of the side rail 18 is a pivotally mounted gate 21. The gate 21 is biased in a clockwise direction with respect to its pivot axis 22 by a spring 23 which has its one end anchored to a fixed post 24 with its other end connected to the gate 21. The gate 21 serves to engage the side of the tumbler group as it is pushed by the plate 17 toward the right and serves to retain the group of tumblers in contact with a second pusher plate 25. The plate 25, as will be described later, is connected to a fluid actuated piston rod 26.

At right angles to the rails 18 and 18a, are a second pair of rails 27 and 27a. The rail 27a is of considerable length and extends from a position in back of the plane of plate 25, across the width of the base 10, and terminates at the edge of the surface 11. The rail 27 is considerably shorter and is connected to a block 28 located adjacent the post 24. The block 28 is adjustably mounted with respect to the surface 11 and may be adjusted by rotation of the hand wheel 29. In this manner the rail 27 may be positioned or spaced at an adjustable distance from the rail 27a. The front surface of the rail 27a determines the extent to which the group of tumblers may be pushed by the pusher plate 17. Positioned in the path of movement of a group of tumblers is a hollow vacuum head or chuck 30. A forward surface of the head 30 has a plurality of perforations 31 formed therein. The head 30 is adjustably mounted on a bracket 32 by a threaded shaft 33 which has its lower end pivotally connected to the head 30. Thus it can be seen that rotation of the screw 33 with respect to the bracket 32 will provide means for adjusting the height of the head 30 relative to the surface 11. The head 30 also serves as the support for a heated wire 34. The wire 34 is mounted vertically and located in substantially the same vertical plane as the perforated surface of the head 30. The wire 34 is connected to a suitable source of electrical power in any convenient manner (not shown).

The head 30 also carries a valve actuator arm 35 (as best shown in FIG. 3), having a downwardly extending portion 36 which is adapted to contact a roller 37 of the three-way valve 38. Thus it can be seen that the valve 38 will have its roller actuated by the arm 35 when the head 30 is in the position shown in FIG. 1. The function of the valve 38 will be later described with reference to FIGS. 5–10. The bottom of bracket 32 is mounted within a horizontal slideway 39 and thus is mounted for sliding movement with respect to the machine base 10. A fluid motor 40, adjustably mounted on the base 10, has its reciprocating piston rod 41 connected to the bracket 32. Reciprocation of the piston rod 41 controls the horizontal movement of the bracket 32 and head 30 carried thereby. The head 30 has a flexible hose 42 coupled to the side thereof through which vacuum is applied to the interior of the head 30 and, by way of the perforations 31, to the forward surface of the head 30. Positioned beneath the head 30 are a pair of bent rods 43 and 43a which have one of their ends extending beyond the vertical plane defined by the front surface of the head 30 and the front surface of the rail 27a. The rods 43 and 43a are pivotally connected to a pair of switches 44 and 44a respectively and serve as the actuator arms therefor. The switches 44 and 44a are actuated by the swinging movement of the arms 43 and 43a. The functions of the switches will be described later with respect to the detailed descriptions of FIG. 10. The swinging motion of the arms 43 and 43a is effected by the movement of a group of tumblers into the banding position by the pusher plate 17. In addition to the actuation of the switches the group of tumblers will be brought into engagement with the perforated surface of the head 30. A strip of pressure sensitive or gummed tape 45 is positioned over the perforated surface of the head 30 with the adhesive bearing side thereof facing away from the head and is held there by the vacuum within the head. The adhesive bearing side of the tape will engage the side of the tumbler group and be adhered thereto by the force of the plate 17 acting against the opposite side of the tumbler group. Tape 45 is supplied from a storage roll 46 which is rotatably mounted at the lower end of a vertical shaft 47. The shaft 47 is adjustably connected to a cross-arm 48. The tape roll 46 exerts a certain amount of tension on the strip 45 by reason of the fact that the roll 46 is frictionally biased against rotation with respect to the shaft 47 by a pressure plate 49 in contact with the side thereof. The degree of frictional resistance offered by the plate 49 to rotation of the roll 46 may be adjusted by varying the compression of a spring 50, which extends between plate 49 and an adjustable stop 51 carried by the shaft 47. The supply roll of tape 46 may be vertically adjusted with respect to the working surface 11 and this adjustment is provided so that the tape 45 will be at substantially the same height as the head 30. As previously described, the head 30 is also vertically adjustable. These vertical adjustments are desirable from the standpoint that the height at which the tape is applied to the group of articles is selected depending on the height of the articles.

Figure 2:
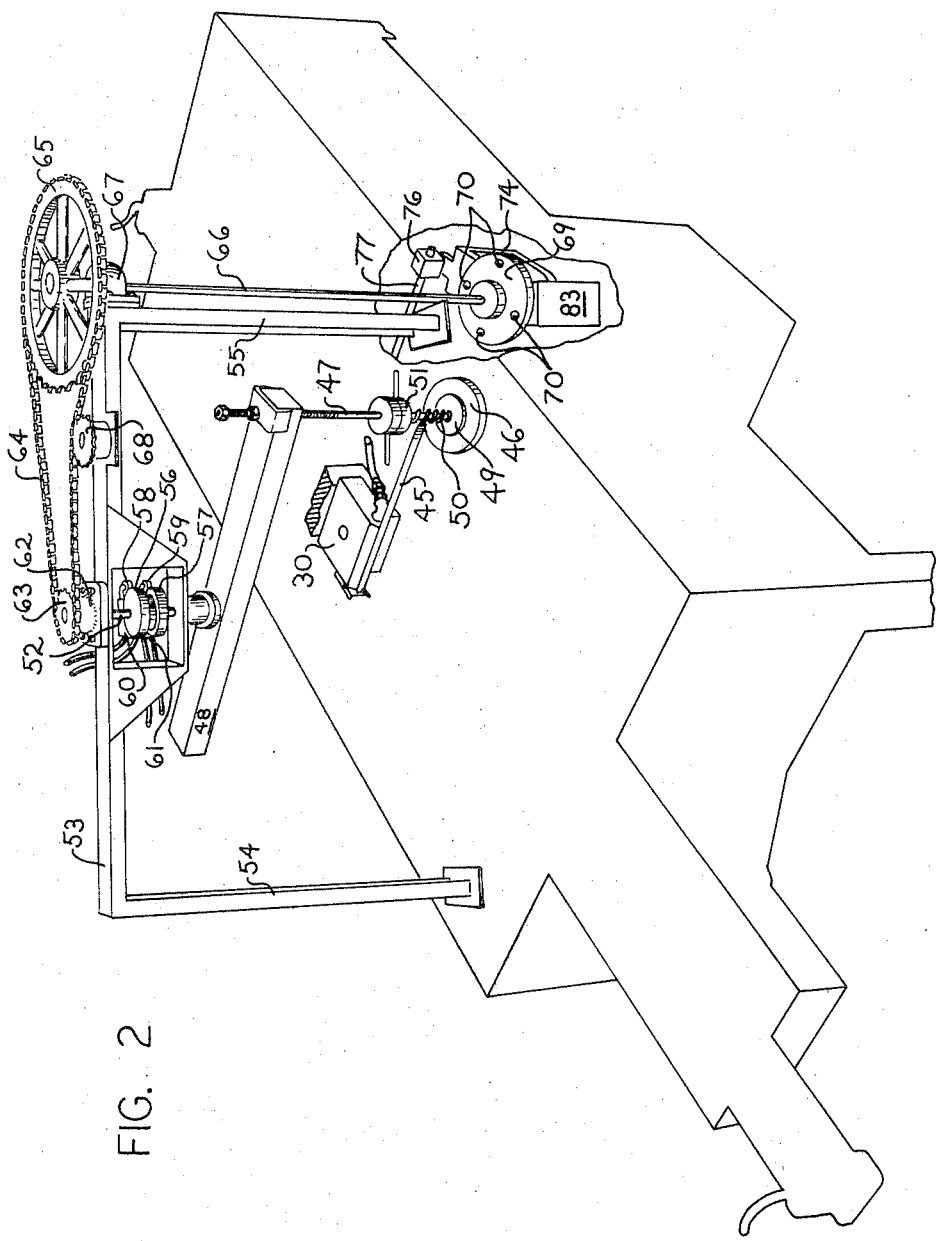
FIG. 2 is a schematic perspective view illustrating the taping drive mechanism used in conjunction with the article handling mechanism of FIG. 1.

As best shown in FIG. 2, the arm 48 is connected to a drive spindle 52 and will be rotated thereby. The spindle 52 is supported in a cross-head 53, which in turn is supported in overlying relationship with respect to the base 10, by a pair of vertically extending frame members 54 and 55. The members 54 and 55 are bolted to the working surface 11, and thus provide mechanism whereby the spindle 52 and arm 48 will pivot about a vertical axis which is generally coincident with the middle of the group of articles to be banded. The spindle 52 has a pair of circular cams 56 and 57 mounted thereon which respectively actuate rollers 58 and 59 of a pair of three-way valves 60 and 61. The upper end of the spindle 52, journaled in a bearing block 62 fixed to the upper surface of the cross-head 53, has a sprocket 63 fixed to the end thereof above the block 62. The sprocket 63 is engaged by an endless chain 64 which lies in a horizontal plane spaced above the upper surface of the cross-head 53. The chain 64 is in engagement with a drive sprocket 65 fixed to a vertically extending drive shaft 66. The upper end of shaft 66 is supported within a bearing block 67 bolted to the upper end of the frame member 55. An idler sprocket 68 engages the chain 64 and serves to provide means for taking up excessive play in the chain 64. The shaft 66 extends downwardly through an opening in the working surface 11 and is fixed to a circular drive plate 69 located beneath the surface 11. The bottom of the shaft 66 is held against lateral displacement by bearing means provided in a fixed part of the base 10.

As can best be seen in FIG. 4, the drive plate 69 has four holes 70 formed therein at circumferentially spaced intervals of 90°. The holes 70 are adapted to be alternately engaged by a pair of detent pins 71 and 72. The detent pin 71 is, in effect, the piston rod of an air cylinder motor 73. The motor 73 is mounted within a C-shaped frame 74, which has its two extending ends provided with bearing elements or roller bearings through which the shaft 66 extends. Thus, the frame member 74 and motor 73 carried thereby is rotatably mounted with respect to the shaft 66 and plate 69. The frame 74 is formed with a radially extending portion 75, which pivotally supports a drive block 76. The drive block 76 is connected to a fluid drive motor 78 by a piston rod 77. The cylinder of the motor 78 has a bifurcated portion 79 at one end which is adapted to embrace a bracket 80. The bracket 80 is fixed to the base 10 and a pivot pin 81 extends therethrough thus pivotally connecting the motor 78 to the base 10.

The detent pin 72 also forms the piston rod of a fluid motor 82 mounted on a C-shaped bracket 83. The bracket 83 has an opening in its upper horizontal leg which is in coaxial alignment with the axis of the pin 72 and the pin is adapted to extend therethrough when the motor 82 is actuated. The bracket 83 is fixed to the base 10 and thus does not move.

The drive mechanism of FIG. 4 is an indexing type drive and, with the parts as shown wherein the detent pin 71 extends through one of the holes 70 in the plate 69, actuation of the motor 78 will pivot the frame 74 in the direction of the arrow 84 to the position shown by dotted lines. The pivotal movement of the frame 74 will effect rotation of the plate 69 through 90° and upon completion of this movement the motor 82 will be actuated to move the detent pin 72 vertically into engagement with another hole 70 in plate 69. The detent pin 71 will then be retracted and the motor 78 actuated to return the bracket 74 to a position preparatory to initiating a second or successive drive of the plate 69 through another 90° angle. Thus it can be seen that the plate 69 is intermittently rotated in the same direction through 90° by the drive mechanism illustrated in FIG. 4.

Figure 10:
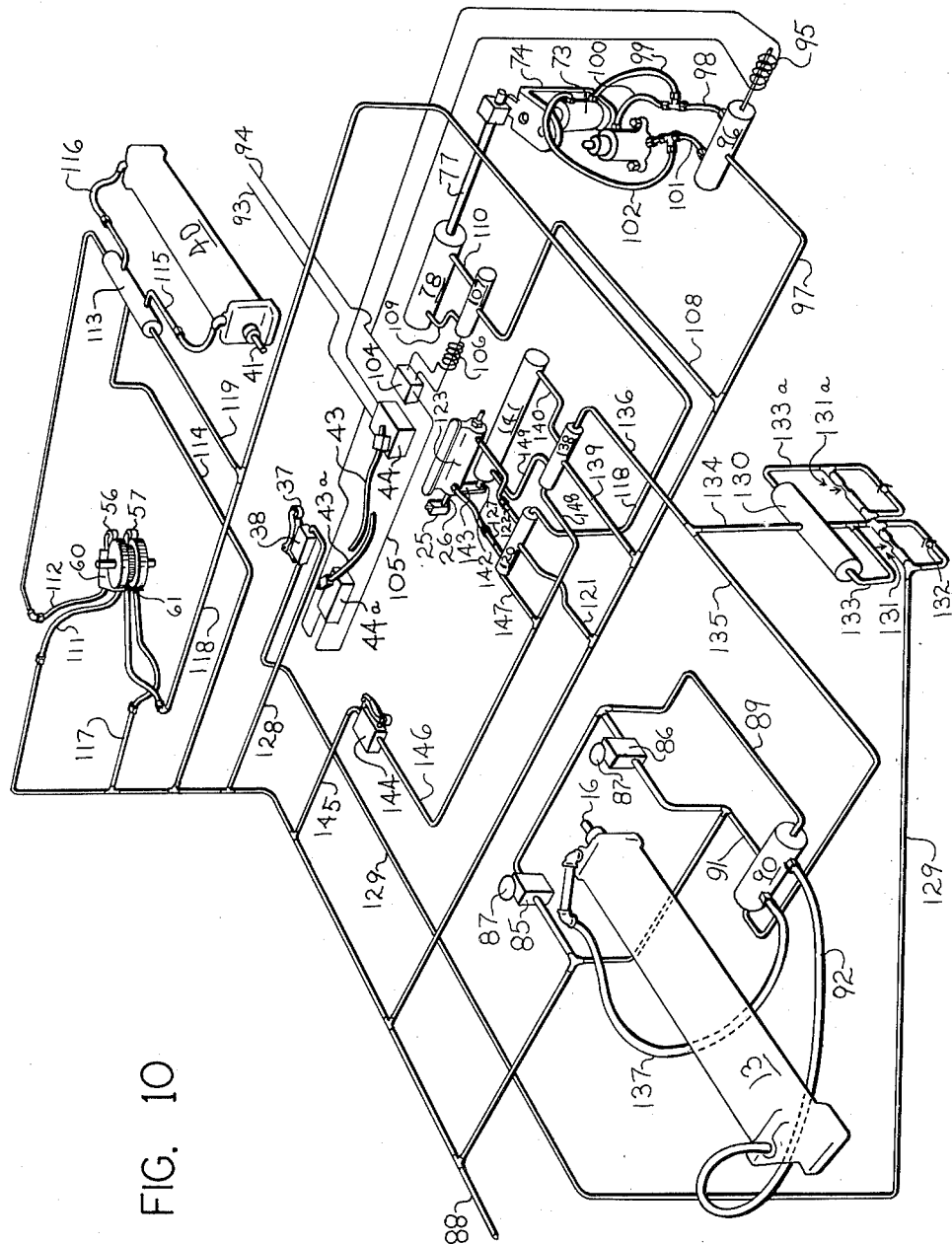
FIG. 10 is a schematic perspective fluid circuit diagram illustrating the connections and controls for all of the motors incorporated in the invention.

Referring now to FIGS. 5–9, which illustrate the sequence of operation of the mechanical parts of the invention, and to FIG. 10, which illustrates the fluid connections between the motors, the operation of the device will be described in detail.

The cycle of operation is started by the manual operation of either of two valves 85 and 86 which have button-type actuators 87 connected thereto. The valves 85 and 86 are three-way valves, and upon depression of either valve fluid under pressure within a supply pipe 88 will be fed through pipe 89 which connects to one end of a four-way valve 90.

The four-way valve 90 and the other four-way valves, which are included in the description to follow, are commercially available spool valves whose spools are shifted axially within the valve housing by the application of fluid under pressure to either end of the valve casing, depending upon the direction of shift required. In effect, the four-way valves are control valves, having a single inlet and two outlets which may be alternately connected so as to provide fluid pressure from the inlet to either of the outlets. The outlet which is not connected to the inlet is usually connected to an exhaust opening. This exhaust opening may be open to the atmosphere in the case where the fluid being controlled is air, or in the case where the fluid being controlled is hydraulic, it is the normal practice to connect the exhaust to a sump. Two of the four-way valves, later to be described, are of the solenoid actuated type in which the spool is shifted by the energization of a solenoid coil to move the valve in one direction and these valves are conventionally spring returned to their other position when the circuit to the coil is opened.

With the depression of the button 87 manually, fluid under pressure which is present in the pipe 91, forming the inlet to the four-way valve 90, will pass into the flexible conduit 92 which in turn is connected to the rear end of the motor 13. Introduction of fluid under pressure to the rear of motor 13 will force the piston rod 16 and the pusher plate 17, in front of which a group of tumblers has been previously placed, to move outward and slide the tumblers over the surface 11 into the position shown in FIG. 5. The paper board retainer around the tumblers (see FIG. 11) will be pushed against the tape being held by the vacuum chuck or head 30, as illustrated in FIG. 5. When the tumblers are pushed against the tape 45 they also pivot the micro-switch rods 43 and 43a which close the switches 44 and 44a respectively. The micro-switches are connected to a suitable source of electric current by the leads 93 and 94. Closing of the micro-switch 44 immediately energizes the solenoid 95 to operate the four-way valve 96. Operation of the valve 96 connects its inlet pipe 97, receiving fluid under pressure from the supply pipe 88, to an outlet pipe 98. The passage of fluid under pressure into the outlet pipe 98 performs two functions, in that the pipe 98 is connected through flexible conduits 99 and 100 to the motors 73 and 82. The conduit 99 is connected to the lower end of the motor 73 and thus forces the detent pin 71 vertically upward into engagement with a hole in plate 69. At the same time fluid under pressure in conduit 100, which is connected to the upper end of the motor 82, will force the detent pin 72 downwardly into unlocking position with respect to the plate 69. At the same time that the valve 96 is shifted to connect the inlet pipe 97 with the outlet pipe 98, the other outlet pipe 101, having branch conduits 102 and 103 connected thereto, is connected to exhaust. The branch conduit 102 is connected to the upper end of motor 73 and the branch conduit 103 is connected to the lower end of motor 82. Thus it can be seen that, depending upon the position of the four-way spool valve 96, fluid under pressure is supplied to the two motors 82 and 83 in such a manner that the pins 71 and 72 are always moved in opposite directions.

Figure 6:
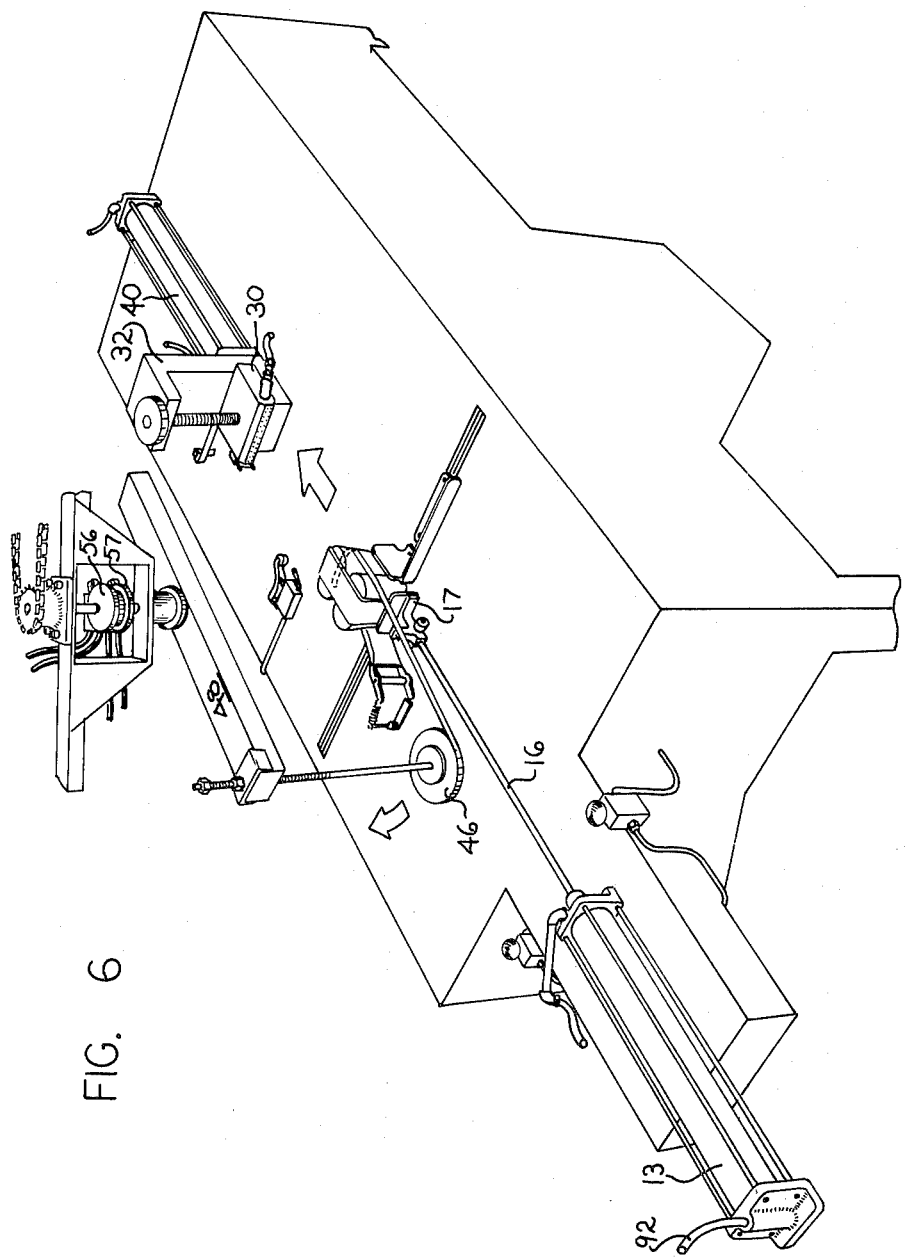
FIG. 6 illustrates the next step in the banding operation with the vacuum chuck retracted and the tape applied part of the way around the group of articles.

The other micro-switch 44a, which is actuated by pivotal movement of the rod 43a, operates through a timer 104, which is connected to the switch 44a by an electrical lead 105. The timer 104 or delay switch after a predetermined interval of time, will connect the lead 105 to the solenoid 106, thus operating a four-way spool valve 107. Shifting of the spool valve 107 by the solenoid 106, connect fluid under pressure in an inlet pipe 108 to the outlet pipe 109, which is connected to the one end of the motor 78. The opposite end of the motor 78 is connected by a pipe 110 to the valve 107 which, after shifting of the valve by the solenoid 106, will be connected to exhaust. Actuation of the motor 78 and its piston rod 77 pivots the bracket 74, and since the bracket is locked to the plate 69, the shaft 66 will be rotated, and through the chain drive mechanism, shown in FIG. 6, the arm 48 will begin rotation and the tape 45 will be wrapped around the tumblers. As shown in FIG. 6, the drive has completed approximately one-fourth of its movement, so that the supply roll of tape 46 will be part-way around the tumblers in its travel.

As the revolution of the tape is in progress, as shown in FIG. 6, the cam 56 will operate the three-way valve 60 and connect its inlet conduit 111 to its outlet conduit 112. The conduit 112 in turn is connected to one end of a four-way valve 113 and will shift the spool of the four-way valve 113 so as to connect the inlet pipe 114 with the outlet pipe 115. The pipe 115 is connected to the forward end of the motor 40. The rearward end of the motor 40 will have its conduit 116 connected through the four-way valve 113 to exhaust. Delivery of fluid under pressure through the pipe 115 will move the piston rod 41 toward the right and shift the bracket 32 and vacuum head 30 to the retracted position shown in FIG. 6. It is necessary that the vacuum head be moved out of the way so that the tape roll 46, carried by the arm 48, will swing around the tumblers and pass between the tumblers and the head 30.

Figure 7:
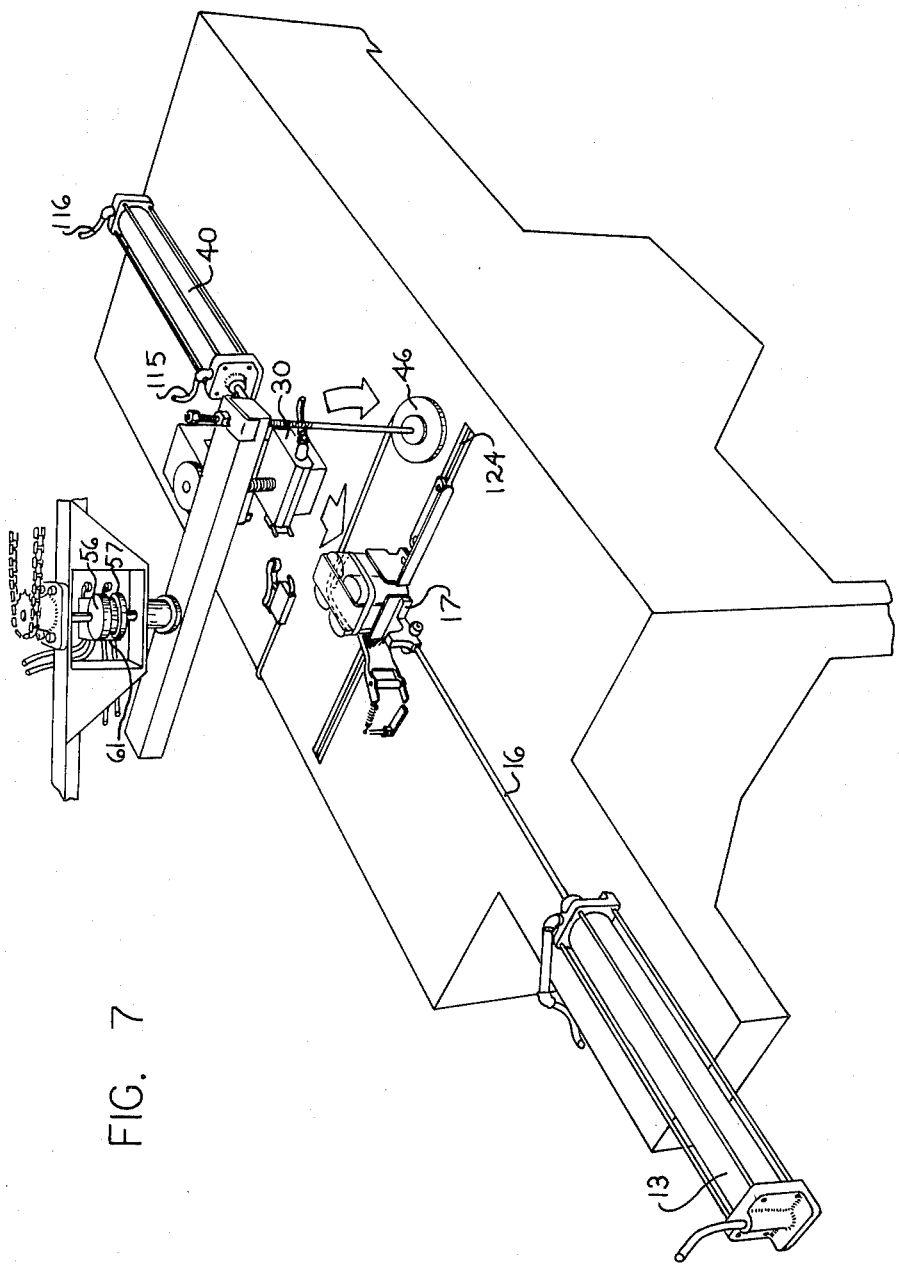
FIG. 7 is a schematic perspective view illustrating the position of the moving parts at the completion of the banding operation.
Figure 8:
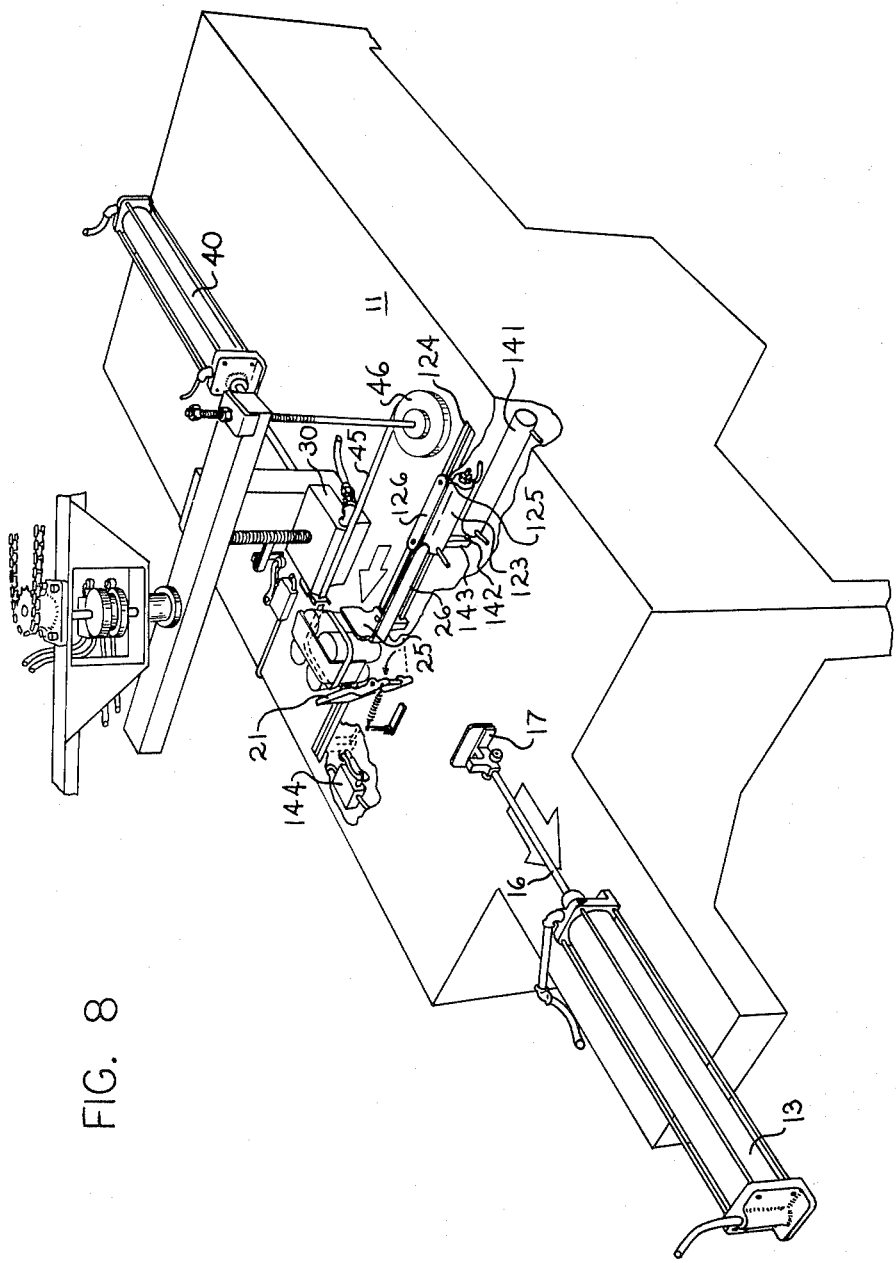
FIG. 8 is a schematic perspective view illustrating the moving of a banded set of articles out of the banding zone prepartory to being discharged out of the machine.
Figure 9:
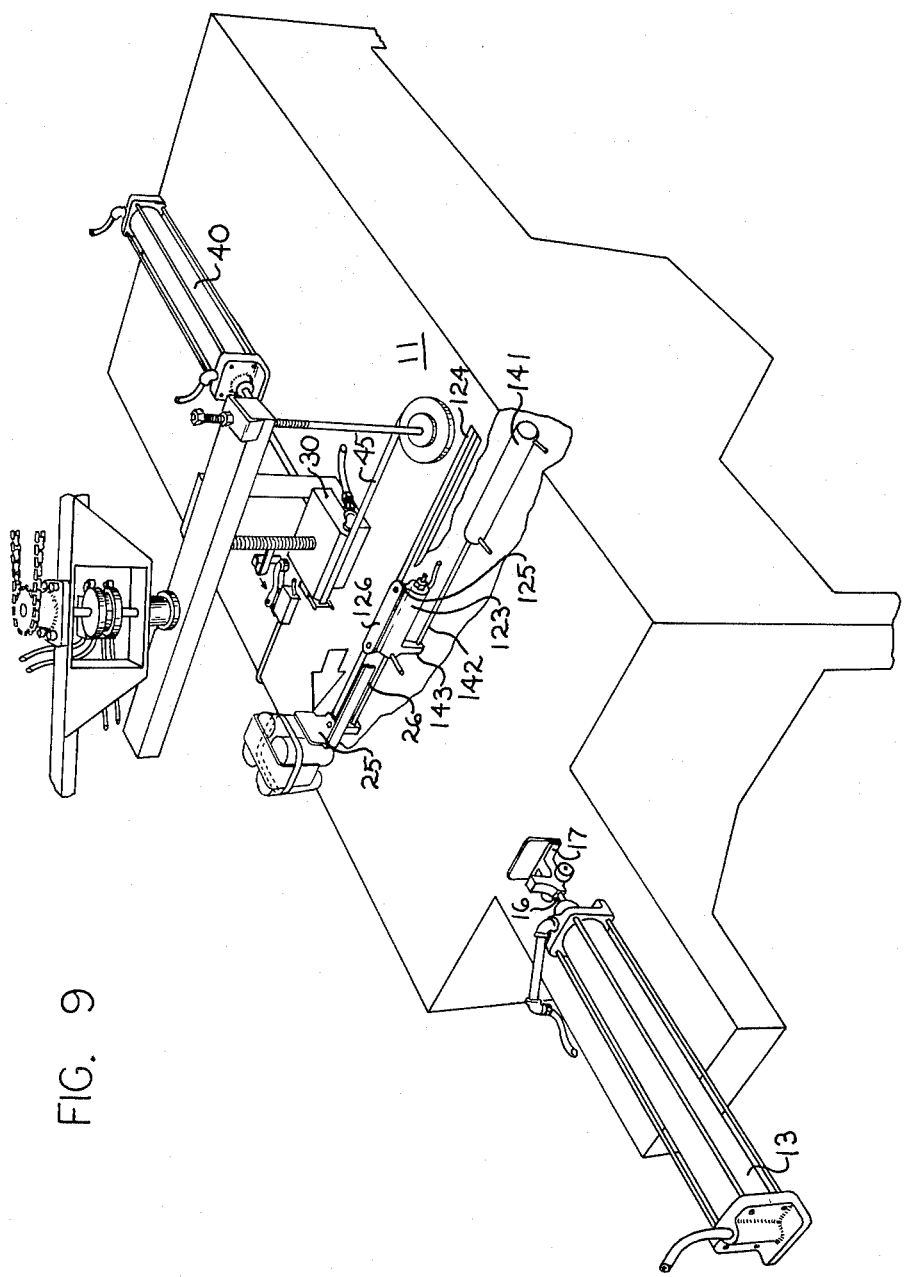
FIG. 9 is a schematic perspective view illustrating the movement of a banded set of articles to discharge position.

Near completion of the 360° travel of the tape roll 46, the cam 57 will actuate the three-way valve 61 to connect its inlet conduit 117 to the outlet conduit 118. The conduit 118 has a branch conduit 119 connected thereto which leads to one end of four-way spool valve 113 to shift the valve spool. At this time the introduction of fluid under pressure through the conduit 119 will shift the four-way valve 113, so that the inlet pipe 114 will now be connected to the conduit 116 and the conduit 115 will be connected to exhaust. Thus the motor 40 is reversed and the vacuum head or chuck 30 will begin to move forward, as illustrated in FIG. 7. The pipe 118 is also connected to one end of a four-way valve 120. The four-way valve 120 has its inlet pipe 121 connected to the source of fluid under pressure, which is present in the pipe 97, and shifting of the valve by pressure from pipe 118 will connect the inlet pipe 121 to the outlet pipe 122. The pipe 122 connects valve 120 to the rear end of a motor 123. The function of the motor 123 is to push the group of tumblers a predetermined distance at right angles to the direction of loading and, in effect, acts as a first position take-out means. As best shown in FIG. 8, the gate 21 will bias the group of tumblers in the direction of the plate 25 so that the group of tumblers will be precisely located by actuation of the motor 123.

The motor 123 is mounted for sliding movement relative to the surface 11 within the track 124 formed therein. The motor 123 has a vertically extending web 125 which extends through the slot forming the track 124 and a plate 126 fastened to web 125 retains the web within the slot. Fluid under pressure in the outlet conduit 122 from the four-way valve 120 actuates the motor 123 to move its piston rod 26 outwardly thereof and the pusher plate 25 carried by rod 26 moves the group of tumblers to the position shown in FIG. 8. This movement is completed prior to the arrival of the vacuum head 30 into engagement with the tape 45, which is now retained in tension between the roll 46 and the side of the group of tumblers. Arrival of the chuck 30 to the position shown in FIG. 8, accomplishes two functions. The hot wire 34 will engage the tape 45 and sever the tape at this point of engagement and the vacuum head 30 will engage the back of the tape along its perforated front surface. The vacuum need not be of a high degree, inasmuch as its only requirement is that it be sufficient to support the severed end of the tape in position preparatory to its application to a further group of tumblers or articles. Obviously, the four-way valve 120 will have its other outlet conduits 127, which is connected to the forward end of the motor 123, connected to exhaust through the valve 120.

As the pusher plate 25 moves the group of tumblers from the position shown in FIG. 7 to the position shown in FIG. 8, the micro-switches 44 and 44a will be opened. Also, it should be clearly understood that the switch 44 will be opened slightly ahead of the switch 44a because the rod 43 clears the tumblers prior to movement of the tumblers to the extent necessary to clear the rod 43a. Thus the solenoid operated valve 96 will shift before the solenoid operated valve 107. In this manner the pin 71 is retracted from the drive plate 69 and the locking pin 72 moved into engagement with the plate 69, prior to actuation of the motor 78 in a reverse or retracting direction.

When the vacuum chuck or head 30 moves into the position shown in FIG. 8, the valve actuating portion 36 of the arm 35 will engage the roller 37 of the three-way valve 38.

Shifting of the three-way valve 38 connects its inlet conduit 128 to the outlet 129. The conduit 129 is connected to a pneumatic pulse valve 130 through a throttle valve 131. The throttle valve 131 has a check valve 132 connected in parallel across its supply and discharge passages. Fluid under pressure in the conduit 129, after passing through the throttle valve 131, will actuate the pneumatic pulse valve 130 by reason of the fact that the pressure will be applied to the end thereof through a pipe 133 connected thereto. Shifting of the valve 130 to the right will cause fluid under pressure from conduit 129 to pass through the valve into an outlet pipe 134. The pulse valve 130 will shift back to the right after a delay period determined by the setting of a throttle valve 131a. As can readily be seen, the fluid pressure in the conduit 129, which has passed through the throttle valve 131 into the pipe 133 will have to pass through the second throttle valve 131a before passing into the conduit 133a which is connected to the right end of the pulse valve 130. In this manner the valve 130 is shifted, first to the right, and then to the left with a definite short period when it is in a position to permit passage of fluid under pressure therethrough into pipe 134. The outlet pipe 134 branches into two pipes 135 and 136, with the pipe 135 being connected to the four-way valve 90 and immediately shifts the spool therein so as to place the pipe 91 in communication with a conduit 137 connected to the forward end of the fluid motor 13. Shifting of the valve 90 also, as previously explained, will connect the conduit 92 to exhaust. Thus the motor 13 is reversed and the pusher plate 17 is started in its retracting movement, as illustrated in FIG. 8. The pipe 136 is connected to one end of a four-way valve 138 which has a fluid supply pipe 139 connected thereto. Shifting of the valve 138 to the left will connect the fluid supply pipe 139 to an outlet conduit 140, thus supplying fluid under pressure to the rearward end of a fluid motor 141. The motor 141 has its piston rod 142 connected to a downwardly extending abutment 143 of the motor 123. As previously described, the motor 123 has been actuated to move its piston rod to its fullest extent to the position shown in FIG. 8. Upon operation of the motor 141 the motor 123 will now be bodily moved, thus moving the pusher plate 25 further to the left, as viewed in FIG. 9, and slide the group of tumblers to the left to the extent that they will clear the surface 11. Any suitable mechanism (not shown) may receive the ware as it slides to the edge of the surface 11 and convey the articles away from the banding apparatus.

Movement of the pusher plate 25 by motor 141 to its farthest position (see FIG. 9) to the left will cause the plate to contact a three-way valve 144 and shift its spool. The three-way valve 144 is connected to the fluid supply pipe 88 by a branch pipe 145 and shifting of the valve 144 by the pusher plate 25 will permit fluid under pressure in the pipe 145 to pass into the outlet pipe 146 which branches into two pipes 147 and 148. The pipe 147 connects to the left end of the four-way valve 120 and the pipe 148 connects to the left end of the four-way valve 138. Thus, after the articles have been moved from the banding area of the mechanism, the spools of valves 120 and 138 will both be shifted to the right. This shifting of valves 120 and 138 will respectively connect the inlet pipes 121 and 139 to outlet pipes 127 and 149 while the outlet pipes 122 and 140 will be connected to exhaust. Thus both the motors 123 and 141 will be operated to shift their rods 26 and 142 to the right, as viewed in FIGS. 8 and 9 to reposition the pusher plate 25 at the loading position shown in FIG. 1.

This completes the description of the operation of the mechanism of the invention through one cycle and subsequent cycles will be initiated by the operation of valves 85 or 86 and proceed in the same sequence.

While the invention has been described primarily as apparatus for applying a band of pressure sensitive tape about a grouping of tumblers, it should be kept in mind that the invention would be equally capable of use in banding a single object or number of objects and should be limited only as necessitated by the scope of the claims.

Having described the invention in detail, applicants claim:

1. Apparatus for applying an adhesive strip about an article comprising, means for moving said article into a predetermined location, means for supporting the free end portion of a roll of adhesive tape in position to be contacted by the movement of an article into said predetermined location, means for moving said tape roll about said article through a full 360° thereby banding the article, means for moving said article in a direction generally parallel to the strip of adhesive attached thereto, but away from the tape roll, means for severing the tape adjacent the article after movement thereof and means for moving the article to a discharge position.

2. Apparatus for applying an adhesive strip about an article comprising means for conveying said article along a path into a predetermined location, means for supporting the end portion of a roll of adhesive tape in position to be contacted by movement of an article into said predetermined location, means mounting said tape roll and for transporting said tape roll about the axis of said article through a full 360°, means for moving said article in a direction parallel to the strip of adhesive attached thereto from the tape roll and means for severing the tape adjacent the article after movement thereof.

3. Apparatus for attaching adhesive tape about an article comprising means for moving said article into a predetermined loaction, means for supporting one end and a portion of a roll of adhesive tape in position to be contacted by movement of an article into said predetermined location, means connected to said tape supporting means for reciprocating same toward and away from the located article, means for transporting said tape roll about said article though a full 360°, means for moving said articles in a direction parallel to the strip of tape attached thereto from the tape roll and means mounted on said supporting means for severing the tape adjacent the article upon movement of said supporting means into tape holding position.

4. Apparatus for applying a strip of adhesive material about a group of articles comprising, means for supporting a supply of adhesive tape in roll form for rotation about a vertical axis, means for supporting the free end and a portion of said tape with its adhesive surface extending in a predetermined vertical plane, means for pushing the group of articles into contact with the adhesive portion of said tape end, means for confining said group of articles to said contact position, means connected to said tape roll supporting means for moving said tape roll through 360° about the group of articles to thereby apply a band of tape therearound, means connected to said means for supporting the free end and a portion of said tape for reciprocating same to permit passage of the roll of tape between the support and the articles, means for pushing the group of articles away from the roll of tape and means mounted on said tape end and portion supporting means for serverving the tape from the roll adjacent the group of articles.

5. Apparatus for applying a strip of adhesive tape about a group of articles comprising, a table having an upper surface, means mounting a roll of tape above said surface with its axis vertical, means on said table for supporting an end portion of said tape with its end extending horizontally and with its surface in a vertical plane, means connected to said table for sliding a group of articles over said surface into contact with the end portion of said tape, means connected to said tape mounting means for moving said tape in a horizontal plane about the periphery of said group of articles, means on said table and connected to said tape end portion supporting means for reciprocating same and means connected to said tape rotating means for actuating said reciprocating means in predetermined sequence.

6. The apparatus as defined in claim 2, wherein said tape end supporting means comprises a vacuum head and means mounted on said vacuum head for severing the tape upon movement of the vacuum head into tape supporting position.

7. The apparatus as defined in claim 3, wherein said tape severing means comprises an electrically heated wire.

8. Apparatus for applying a strip of adhesive tape about a group of articles comprising, a table having an upper horizontal surface, means mounted above said surface for supporting a roll of tape with its axis vertical, a first reciprocating fluid motor mounted on said table, said first motor being adapted to slide a group of articles on said table surface into a predetermined position, a second reciprocating fluid motor mounted on said table in axial alignment with respect to said first motor, means connected to said second motor for supporting a length of said adhesive tape with its adhesive surface facing in the direction of movement of a group of articles moved by said first fluid motor, means connected to said tape length supporting means for adjusting the vertical height of said supporting means in relation to the surface of said table, said second fluid motor being adapted to move said tape length supporting means into a predetermined vertical plane wherein arrival of the group of articles into said predetermined position will adhere the length of tape carried by said support to the side of said group of articles, means connected to said means for supporting the roll of tape for moving said tape in a horizontal plane about the periphery of said group of articles, means responsive to movement of said tape roll supporting means for actuating said second fluid motor to retract said tape length supporting means out of the path of movement of the roll of tape, a third reciprocating fluid motor connected to said table with its axis at right angles to said first and second motors and adapted to slide a group of banded articles at right angles with respect to the movement of the articles into banding position, means responsive to movement of said tape roll supporting means through approximately its full 360° movement for actuating said second and third motors whereby said group of articles will be shifted at right angles with respect to the axis of said first and second motor with the end of the tape still attached thereto and said second motor will move said tape length supporting means into contact with the span of tape extending between the group of articles and the tape roll, and means carried by said tape supporting means for severing said tape adjacent said group of articles.

9. Apparatus for applying a strip of adhesive tape about a group of articles comprising, a table having an upper horizontal surface, means mounted on said table for supporting a roll of tape above said surface with its axis vertical, a first fluid motor mounted on said table, said first fluid motor being adapted to slide a group of articles on said table surface into a predetermined position, a second fluid motor mounted on said table in axial alignment with respect to said first fluid motor, means connected to said second fluid motor for supporting a length of said adhesive tape with its adhesive surface facing in the direction of movement of a group of articles moved by said first fluid motor, means connected to said tape supporting means for adjusting the vertical height of said supporting means in relation to the surface of said table, said second fluid motor being adapted to hold said tape supporting means at said predetermined position wherein arrival of the group of articles into said predetermined position will adhere the length of tape carried by said support to the side of said group of articles, means connected to said means for supporting the roll of tape for moving said tape in a horizontal plane about the periphery of said group of articles, means responsive to movement of said tape roll supporting means for actuating said second fluid motor to retract said tape length supporting means out of the path of movement of the roll of tape, a third fluid motor connected to said table and adapted to move the group of articles which have been banded at right angles with respect to the initial movement of the articles into banding position, means responsive to movement of said tape roll supporting means through approximately its full 360° movement for actuating said second and third motors whereby said group of articles will be slid at right angles with respect to the axis of said first and second motor with the end of the tape still attached thereto and said second motor will move said tape length supporting means into contact with the span of tape extending between the group of articles and the tape roll, means carried by said tape length supporting means for severing said tape adjacent said group of articles and means connected to said third motor, responsive to movement of said tape supporting means into tape contacting position, for sliding the group of taped articles from the surface of said table.

References Cited by the Examiner

UNITED STATES PATENTS

| 1,640,465 | 1/1925 | Muller | 53—198 |
| 2,504,059 | 4/1950 | Weber | 53—139.3 |
| 2,732,881 | 1/1956 | Anderle. | |
| 2,972,843 | 2/1961 | DuBroff | 53—198 |

FOREIGN PATENTS 591,646  8/1947  Great Britain.

FRANK E. BAILEY, *Primary Examiner.*

TRAVIS S. McGEHEE, *Examiner.*